Oct. 3, 1967      E. S. MESSER ET AL      3,344,924
MERCURY FILTERING APPARATUS
Filed April 4, 1966
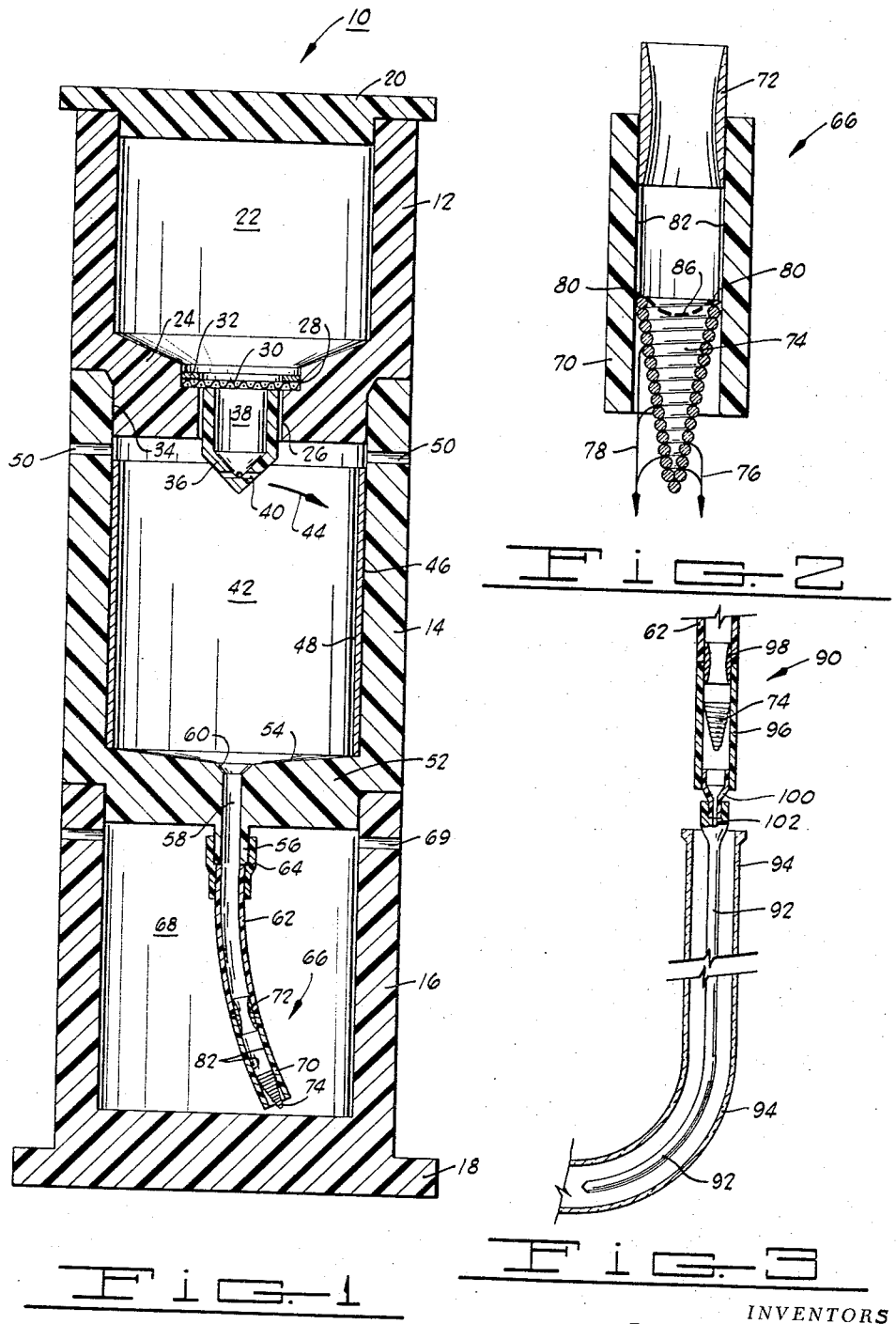
INVENTORS
ELMER S. MESSER &
WILLIAM M. CARNAHAN
BY
Dunlap and Laney
ATTORNEYS United States Patent Office 3,344,924
Patented Oct. 3, 1967

3,344,924
MERCURY FILTERING APPARATUS
Elmer S. Messer, Tulsa, and William M. Carnahan, Sand Springs, Okla., assignors to Flow Measurement Company, Inc., Tulsa, Okla., a corporation of Oklahoma
Filed Apr. 4, 1966, Ser. No. 540,038
10 Claims. (Cl. 210—202)

This invention relates to improvements in the art of mercury filtering and, more particularly, but not by way of limitation, to a filtering apparatus having compact structure which can be readily employed to separate base metal oxides, liquid impurities, etc. from a body of liquid mercury.

Mercury is a metal which has unusual physical characteristics which render it valuable in various industrial process and instrumentation facilities. Because of its desirable properties, particularly its high specific gravity and uniform bright color, it is commonly used in strument recorders as a pressure indicator. One of the problems attendant the use of mercury in indicating equipment is that of the development of oxide film and other contaminants which biuld up on the surface to obscure the meniscus delineation, thus interposing an indefinite quality to any readings which are taken.

Such base metals as lead, tin, zinc, cadmium, etc. are easily dissolved when they come in contact with mercury and they form a scum of oxides when the solution is exposed to air. Mercury can also be contaminated by floating dust, oil, etc. when the liquid metal must be employed in an environment containing such impurities.

Heretofore, several prior art mercury cleaning processes have been employed such as multiple distillation, chemical separation with 25% nitric acid, aeration and water washing, but generally speaking, these are precise processes which do not lend themselves to rapid utilization e.g. as is required in servicing the mercury in a field pressure recorder.

The present invention contemplates a compact filtering device which may be readily employed at a remote or field installation to clean a quantity of mercury. More particularly, the invention utilizes a means for separating the quantity of mercury into droplets which are brought into contact with an absorbent filtering substance to remove various liquid impurities while effecting oxidization of base metals in solution and, thereafter, the mercury is passed through a mercury wettable straining element into a final storage container, the less dense oxide impurties being retained from passing through the mercury wettable straining element. It is further contemplated that the clean mercury may be flowed from the straining element directly back into its reservoir or container within the particular instrument, and in such a manner that minimum contact with air takes place and oxidization of base metals is maintained at a minimum.

Therefore, it is an object of the present invention to provide a mercury filter which can be readily employed at field or other remote installation to rapidly clean a quantity of contaminated mercury.

It is also an object of this invention to provide a filtering apparatus wherein aeration of the quantity of mercury is carried out and individual droplets are cleansed of various liquid impurities while, at the same time, dissolved base metals are more completely oxidized to enable their subsequent separation from the liquid metal.

It is further an object of this invention to provide a mercury filter that can be used to purify mercury as may be contained in manometers, pressure recorders, etc., which are located at remote installations having an environment which varies greatly from desired laboratory conditions.

Finally, it is an object of the present invention to provide a mercury filtering apparatus which purifies mercury to a high degree by a single procedure or operation upon the quantity of mercury, and wherein the cleansed mercury can be re-deposited or stored in such a manner that a minimum of oxidization residue will remain.

Other objects and advantages of the invention will be evident from the following detailed desecription when read in conjunction with the accompanying drawings which illustrate the invention.

In the drawings:

FIG. 1 is a side view of the mercury filtering apparatus in cross section;

FIG. 2 is an enlarged cross-sectional view of the straining element; and

FIG. 3 is an alternative straining element including a capillary delivery tube which may be employed in selected operations.

As shown in FIG. 1, the filtering apparatus 10 consists of three compartmental sections, upper section 12, middle section 14 and base section 16, which are interconnectable in columnar relationship. The base portion 16 has a broadened foot portion 18 formed thereon while the upper section 12 may receive a cover or lid 20. Each of the sections 12, 14 and 16 may be molded, turned or otherwise formed from material which is non-reactive to the various elements which may be contained therein, e.g., Plexiglas. The sections 12, 14 and 16 are shown in FIG. 1 as being of cylindrical configuration, but any size or cross-sectional configuration may be employed as required by the exigencies of the use.

The upper section 12 defines a volume or space 22 wherein the contaminated mercury is received. The bottom 24 of upper section 12 has a centrally located hole or opening formed as a lower passage 26 and an upper, counterbore portion 28 of slightly larger diameter. A piece of stainless steel screen 30 is retained within the counterbore 28 by means of suitable internal locking spring 32. The statinless steel screen 30 is utilized to catch large dirt and rust particles and may be on the order of 15–20 mesh/inch screen material. The upper section 12 has a milled portion 34 which is sized so that it may be firmly received within the upper opening of middle section 14 of the filtering apparatus 10. In some applications it may be desirable to provide O-ring or other sealing means between the sections 12, 14 and 16.

A diaphragm element 36, revolutional in nature is press fitted into the hole 26. The diaphragm element 36 may also be formed from Plexiglas or other suitable glass or plastics which are non-reactive to the elements being processed. The element 36 is open at the upper end to expose an inner space 38 which receives the mercury and other substance falling through the stainless steel screen 30. A plurality of horizontally drilled holes 40 are provided about the lower end of diaphragm element 36 to conduct the contaminated mercury for introduction in fine streamlets into the middle section 14. It has been found that bore holes 40 in quadrature relationship will provide a sufficient flow and aeration operation as will be further described.

The thin streams of mercury are emitted from holes 40 into the inner space or volume 42 of middle section 14 so that maximum aeration of the total volume of mercury is effected. That is, the streamlets are directed, as shown by the heavy arrow 44, against the side wall of middle section 14 whereupon each such stream of contaminated mercury is continuously broken up into a plurality of minute droplets. The inner side wall 46 of middle section 14 is covered by a cylindrical filter member 48 which may be a suitable commercially available type of high retention, absorbent filter paper. Thus, the action of the breaking up of the mercury streamlets into fine droplets along the filter element 48 not only oxidizes the dissolved base metals, thereby enabling later separation of impurities, but it also provides much greater contact of individual droplets with the filter element 48 such that oil, water and other separated liquid impurities are absorbed in the filter element 48. A plurality of orifices 50 may be provided about the upper end of middle section 14 to allow entry of air into the space 42.

The middle section 14 is formed with a bottom portion 52 having a suitable, centrally tapering surface 54. The bottom portion 52 is also formed to have a collar 56 through which a passage or orifice 58, countersunk as at 60, provides exit flow of the aerated mercury from the middle space 42. The collar 56 is connected to a tube member 62 by means of a suitable clamping or coupling sleeve 64. The tube 62 as well as the coupling sleeve 64 may be formed from selected plastic tubing such as commercially available polyvinyl types. The tubing 62 then provides passage of the aerated mercury to a strainer element 66 which causes oxide and other impurities to be retained within the plastic tubing material while purified or cleansed mercury is allowed to flow into the interior space 68 of lower section 16. Air venting is provided by means of holes 69 located about the upper extremity of lower section 16. Also, as will be further described, it may be desirable to position the tube 62 and strainer element 66 so that the cleansed mercury flows directly back into its particular instrument reservoir.

FIG. 2 shows an enlarged cross-section of the strainer element 66 which may be employed for shallow deposit of the cleansed mercury. Strainer element 66 consists of a section of plastic tubing 70, as selected from non-reactive materials. The upper end of tubing 70 is fitted with a stainless steel coupling sleeve 72 which may be bonded within the upper opening of tubing 70 and which can be press fit into the exit tubing 62 of the filter apparatus 10. The stainless steel coupling 72 is preferably formed with thin side walls and an outwardly tapering inside passage as illustrated. A mercury seal or filter element 74 of conically wound wire is then inserted in the lower end of tubing 70, a firm, press-fit insertion being sufficient.

The filter element 74 may be formed from 80–90% silver wire wound to a closed cone tip. The mercury seal or filter element 74 is formed by tightly winding the conical wire form and then turning a spreader through each convolution to provide a continuous separation of a few mils. A separation of 5 mils between each convolution of the coil has proven satisfactory. The silver wire cone functions to filter because silver is a mercury wettable metal which allows the mercury to pass down through the cone and in between convolutions, as shown generally by the arrows 76 and 78, while the base metal oxides, scale and other impurities cannot pass over the top or shoulder 80 of the mercury wettable filter element 74, such impurities being retained along the inside areas 82 of plastic tubing 70. It is also contemplated that a helically wound filter element having a closed bottom end may prove suitable for certain applications.

One method of forming the mercury seal or filter element 74 is by tightly winding the silver wire upon a mandrel of selected length and slope and thereafter revolving a spacer gauge of the desired thickness through the convolutions of the wire. It is contemplated also that wire formed from gold and other metals having the desirable physical characteristics may be used in forming the conical filter element. The length of tubing section 70 may be varied to adapt to the particular employ of the filter apparatus 10, it being desirable to deposit the cleansed mercury with minimum turbulence near the bottom of a reservoir, and such an alternative adaptive device will be further described below.

In the operation of filter apparatus 10, a quantity of contaminated mercury is poured into the space 22 of upper section 12. The contaminated mercury may contain certain base metals in solution, as well as oil, water, rust scale and certain of the oxides of the base metal particles held in suspension as well as in the form of a froth or film on the surface of the mercury. The contaminated mercury flows downward through stainless steel screen 30, large particles and scale being removed, and then into the inner space 38 of diaphragm element 36. The mercury is then flowed out through the small, horizontally directed orifices 40, as shown by arrow 44, where it is dashed against the vertically disposed filter element 48 lining the space 42 of middle section 14. Upon striking the filter element 48, the mercury is broken up into minute droplets, continuously as the mercury flow proceeds, thereby exposing a much increased surface of mercury to the air such that maximum oxidization of dissolved base metal particles is effected. Also, the individual droplets or particles come in contact with the absorbent filter element 48 to remove oil film, water and such impurities as are capable of being absorbed. Oxides and impurities held in suspension are also brought to the surface of small drops of mercury where they form a brittle layer of oxides.

The droplets of mercury are then collected in the bottom of space 42 (middle section 14) as a body of mercury having increased surface impurities due to the aeration which increases oxidization of dissolved base metals. The brittle layers of oxides tend to disintegrate when drops come together and the oxides form on the new surface of several drops or large pools of mercury. The mercury can then flow down through passage 58 coupling 64 to the tube 62 which is connected to a strainer element 66 of the conical, silver-wire type as shown in FIG. 2. Mercury flowing down through tube 70 will pass through the mercury-wet, conical, silver wire filter element 74 while the base metal oxides will not be allowed to pass over the shoulder 80 of silver wire (see FIG. 2). In all cases, it is desirable to introduce a drop of clean mercury into the strainer element 66 prior to the filtering procedure to make the silver wire mercury-wet.

Once the mercury wets the silver wire surface, the meniscus, as shown by dotted line 86 in FIG. 2, will become concave, and the shoulder or edge 80 of the filter element 74 forms a seal which prevents dirt and oxide materials from entering the filter element. A large quantity of oxides and minute rust particles can be supported by the mercury-wet silver wire seal since the load support is quite large, the force varying directly with surface tension. Since the surface tension of mercury is large and the meniscus radius small, a great amount of less dense base metal oxide and particle material can be supported above the mercury-wet seal.

As the quantity of contaminated mercury proceeds through the filter apparatus 10, the strained mercury from filter element 74 is collected within space 68 of base section 16, air vents 69 allowing displacement of air. After the entire quantity of mercury is cleansed and contained within space 68, the base section 16 can be loosened and removed from the remainder of filter apparatus 10 whereupon it can be re-introduced into its original reservoir. The volume of spaces 22, 42 and 68 may be designed to any size, depending upon the particular usage of the filter apparatus 10.

In some cases, it has been found desirable that the base section 16 be removed from filter apparatus 10 and the filter procedure carried out with strainer element 66 placed for redeposition down in the mercury reservoir. This can be carried out by employing base sections 16 as a pouring container for transferring the contaminated mercury from the reservoir drain to the space 22 of upper section 12. Thus, if the remainder of filter apparatus 10 is positioned in some manner above the reservoir so that tube 62 and strainer element 66 suspend into the reservoir, the cleansed mercury will be re-introduced into the reservoir with a minimum of turbulence and aeration as would result from a pouring procedure. The strainer element 66, of short length, has proven particularly suitable for use with orifice-type metering pressure recorders. Such pressure recorders are often located in remote field positions and the filter apparatus 10 provides rapid, efficient cleaning of the recorder mercury. The replacement of silver wire filter elements 74 and the filter paper 48 may be done as needed. Also, it may be desirable, periodically, to flush out the individual sections of filter apparatus 10 with a suitable solvent.

FIG. 3 illustrates an alternative type of strainer element 90 coupled with a delivery tube 92 which may be used for certain other applications. For example, certain manometer tubes require a long vertical section, such as section 94, for allowing pressure variation of mercury levels. This mercury too must be cleaned periodically and it can be readily seen that to pour the cleansed mercury back into the vertical length of the manometer tube would create much bubbling and turbulent flow down through the tube so that undue aeration takes place to generate a new oxide film on the meniscus of the mercury. Thus, the alternative strainer element 90 and tube 92 can be utilized to deposit the cleansed mercury from the bottom upward within the manometer tube, thus preventing further oxidization of base metals which may remain in solution with the cleansed mercury.

Strainer element 90 consists of a section of tube 96 which is fitted with a stainless steel coupling element 98. The coupling element 98 can be inserted into the lower end of tube 62 in a manner similar to that of the connection of strainer element 66 (FIG. 1). The lower end of tubing 96 contains a stainless steel coupling member 100 which is tapered downward for insertion into the enlarged end 102 of the delivery tube 92. The delivery tube 92 is a capillary tube having a very small diameter passage and it can be made as long as is required by the particular instrument which is being serviced or processed. In this case, it is shown as reaching the lower level of the manometer tube so that cleansed mercury is released and flows upward, filling the manometer with a minimum of air contact. The coupling 102 shown as an enlarged sleeve section; however, it may be desirable to employ merely an additional piece of tubing as a sleeve member joining the lower portion of stainless steel coupling 100 end an end of the capillary delivery tube 92.

The foregoing discloses a mercury filter which can be readily transported and maintained in the field for use in periodically servicing remotely located instruments which utilize mercury metal. In addition, the filtering apparatus is also suited for use in the laboratory due to the facility with which it may be employed to cleanse contaminated mercury to a relatively high degree of purity through a single operational procedure. The invention further possesses the advantage of re-deposition of the cleansed mercury such that a minimum of air contact is made by the liquid metal as a whole. Such re-deposition can be carried out by delivery tubes, capillary tubes or whatever or any selected length, and such may be adapted for the particular instrument or other mercury-containing facility being serviced.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:
1. A device for filtering mercury in liquid state, comprising:
first means for receiving the contaminated mercury and directing said mercury into a plurality of fine streams through air to increase the probability of oxidization of any metal contaminants in said mercury;
second means for collecting said fine streams of mercury and including an absorbent filter surface in contact with said collected mercury; and
third means for receiving said collected mercury and including a strainer element with a mercury wettable metal filter such that the collected mercury can pass through the strainer element to the exclusion of impurities.

2. A device for filtering mercury as set forth in claim 1 wherein said strainer element comprises:
tubing means for receiving the mercury collected by said third means; and
a conically wound silver wire having the wide portion of the cone received upwardly and firmly within said tubing means to form a mercury seal upon being wetted by mercury.

3. A device for filtering mercury as set forth in claim 1 wherein said first means comprises:
first container means having a centrally located, vertical hole through the bottom, said hole being counterbored from the top;
stainless steel screen means disposed over said hole and maintained within said counterbored portion; and
diaphragm means inserted upwardly in and retained within said hole beneath said screen means, said diaphragm means being hollow and opening upwardly to said screen means and having horizontally directed holes about its lower portion such that mercury passing through said screen means is directed into fine, horizontal streams through air.

4. A device for filtering mercury as set forth in claim 1 wherein said second means comprises:
container means positioned below said first means to collect said fine streams of mercury; and
absorbent filter means lining the walls of said container means and positioned to intercept said fine streams of mercury to thereby cause each to break up into a plurality of droplets.

5. A device for filtering mercury as set forth in claim 3 wherein said second means comprises:
a second container means interconnected below said first container means;
absorbent filter means positioned to line the vertical inner walls of said second container means and to intercept said fine streams of mercury to thereby cause each to break up into a plurality of droplets.

6. A device for filtering mercury as set forth in claim 4 wherein said third means comprises:
first tubing means for receiving said collected mercury;
second tubing means including a stainless steel coupling member for attaching said first and second tubing means; and
conically wound silver wire means having its wide diameter end inserted upwardly within said second tubing means to provide a mercury seal when wetted with mercury such that mercury can pass downward through the conically wound silver wire to the exclusion of base metal oxides and other nonreactive solid particles.

7. A device for filtering mercury as set forth in claim 6 which is further characterized to include:
capillary tube means of selected length;
coupling means for coupling said capillary tube means to said second tubing means such that the filtered clean mercury is directed through said capillary tube means.

8. A device for filtering mercury in liquid state, comprising:
first container means having a generally cylindrical cup-shape and a centrally located hole through the bottom;
stainless steel screen means positioned to cover said hole;
diaphragm means situated in said hole below said screen and having a plurality of horizontally directed exit holes siutated about its lower extremity such that mercury passing through said screen means into said diaphragm means is directed in fine horizontal streams;

second container means having a generally cylindrical cup-shape and a centrally located hole through the bottom and being affixed below said first container means and having its vertical inner walls disposed to intercept said fine streams;

absorbent filter means disposed to cover said vertical, inner walls;

tubing means receiving collected mercury through said hole in said second container means; and strainer means including a conically wound silver wire filter for receiving said collected mercury from said tubing means and passing mercury to the exclusion of base metal oxides and other foreign matter.

9. A device for filtering mercury as set forth in claim 8 which is further characterized to include:

capillary tube means connectable in air tight relationship to said strainer means to deliver clean mercury for deposition within a reservoir and at its lower extremity.

10. In a liquid mercury cleaning apparatus, the improvement which comprises:

a perforated, coarse filtering element for screening large impurities from the liquid mercury;

means for collecting mercury which has passed through said coarse filtering element;

conduit means for receiving mercury from said collecting means; and a helically wound wire of mercury wettable metal having one end of the helix closed and the other end in flow communication with said conduit means.

References Cited

UNITED STATES PATENTS 2,237,882  4/1941  Lawlor et al. _____ 210—50

OTHER REFERENCES

Moore, B.: Mercury Purification. In The Industrial Chemist, pp. 63, 64, February 1932.

Newbery, E.: Laboratory Methods for the Purification of Metallic Mercury. In The Industrial Chemist, pp. 289–291, July 1929.

SAMIH N. ZAHARNA, *Primary Examiner.*

D. M. RIESS, *Assistant Examiner.*